United States Patent [19]

Krisch et al.

[11] Patent Number: 5,691,479
[45] Date of Patent: Nov. 25, 1997

[54] PRESSURE TRANSDUCER WITH A HOUSING FOR USE WITH A CONVENTIONALLY PACKAGED PRESSURE SENSOR

[75] Inventors: Burkhard Krisch; Werner Riedel, both of Berlin, Germany

[73] Assignee: Siemens Aktiengellschaft, München, Germany

[21] Appl. No.: 491,901

[22] PCT Filed: Dec. 21, 1993

[86] PCT No.: PCT/DE93/01238

§ 371 Date: Sep. 25, 1995

§ 102(e) Date: Sep. 25, 1995

[87] PCT Pub. No.: WO94/15189

PCT Pub. Date: Jul. 7, 1994

[30] Foreign Application Priority Data

Dec. 23, 1992 [DE] Germany .................. 42 44 459.4

[51] Int. Cl.⁶ .................................................. G01L 7/00
[52] U.S. Cl. .................................................. 73/756
[58] Field of Search ........................ 73/706, 708, 715, 73/716, 717, 718, 719, 720, 721, 722, 723, 724, 725, 726, 727, 728, 756, 431; 338/4, 42; 361/283

[56] References Cited

U.S. PATENT DOCUMENTS

| 4,653,330 | 3/1987 | Hedtke | 73/431 |
| 4,754,648 | 7/1988 | Byrd et al. | 73/756 |
| 4,918,833 | 4/1990 | Allard et al. | 73/756 |

FOREIGN PATENT DOCUMENTS

| 0 126 989 | 12/1984 | European Pat. Off. . |
| 30 47 276 | 9/1981 | Germany . |
| 42 03 832 | 8/1992 | Germany . |
| 91/04475 | 4/1991 | WIPO . |
| WO 91/04475 | 4/1991 | WIPO . |

OTHER PUBLICATIONS

Siemens Datenbuch 1990/91 (Siemens Databook 1990/91): *Silizium Temperatur–und Drucksensoren* (*Silicon Temperature Sensors and Pressure Sensors*) p. 98.

rtp Regelungstechnische Praxis, vol. 24, 1982, No. 7, pp. 223–230: *Halbleiter-Druckaufnehmer mit Integrierter Piezoresistiver Widerstandsbrücke*, U. Theden et al., Berlin, DE.

*Primary Examiner*—Richard Chilcot
*Assistant Examiner*—William L. Oen
*Attorney, Agent, or Firm*—Kenyon & Kenyon

[57] ABSTRACT

A pressure transducer with a disk-shaped pressure sensor component is connected to a pressure supplying body. The pressure sensor component is surrounded on the outside by a cap-like part whose bottom is above the side of the pressure sensor component that faces away from the pressure supplying body. The pressure supplying body is also connected to a pressure transmitting part over a separating membrane. In order to be able to produce such a pressure transducer at a comparatively low cost, the pressure sensor component is a standard pressure sensor with a conventional base like those used to manufacture semiconductor components. The base of the pressure sensor is in contact with the bottom of the cap-like part through an intermediate filling of cast resin. The bottom of the cap-like part has individual openings for connecting wires and the connecting tube on the low pressure side. The cap-like part is welded to the pressure transmitting part.

2 Claims, 2 Drawing Sheets

PRESSURE TRANSDUCER WITH A HOUSING FOR USE WITH A CONVENTIONALLY PACKAGED PRESSURE SENSOR

BACKGROUND OF THE INVENTION

The present invention concerns a pressure measurement transducer with a disk-shaped pressure sensor component that is welded to a pressure supplying body in the edge area of one side, with a cap-like part surrounding the pressure sensor component on the outside and with its bottom above the side of the pressure sensor component that faces away from the pressure supplying body, where insulated electric connecting wires pass through the bottom, and with a pressure transmitting part that is connected by a separating membrane to a side of the pressure supplying body farthest away from the pressure sensor component.

A pressure transducer of this type is described in German patent 3,047,276 A1. Although the transducer disclosed in that publication is referred to as a differential pressure transducer, it is actually a pressure transducer using atmospheric pressure as the reference pressure. With the known pressure transducer, the disk-shaped pressure sensor component is manufactured individually for the pressure transducer by mounting a semiconductor pressure sensor element on a sensor supporting body. The sensor supporting body is held in a disk-shaped sealing part by welding. The sealing part also has a ceramic substrate surrounding the pressure sensor element and having connecting wires that are attached to electric terminals of the pressure sensor element. The structure consisting of the pressure sensor element and the ceramic substrate is protected by a ceramic safety cover. In addition, a metal disk that closes a low-pressure-side connection of the sensor supporting body on the low pressure side is welded in the side of the sealing part that faces away from the pressure sensor element. The pressure sensor component of the known pressure transducer with this structure is welded to a pressure supplying body at the edges. This pressure supplying body is provided with a through hole for the pressure feed on the high-pressure side and with another through hole for the low-pressure feed for the pressure sensor component. The pressure supplying body also contains a transducer middle part with a compensating membrane and it is connected to a pressure transmitting part by a separating membrane.

SUMMARY OF THE INVENTION

The present invention provides a pressure transducer that can be manufactured easily and therefore inexpensively.

According to this invention, this object is achieved with a pressure transducer of the pressure sensor type described initially as a standard pressure sensor with a base of the type conventionally used in the production of semiconductor components with electric connecting wires and a connecting tube on the low pressure side. The base of the standard pressure sensor is in contact with the bottom of the cap-like part via an intermediate filling of cast resin. The cap-like part has individual through holes for the connecting wires and the connecting tube on the low-pressure side, and the cap-like part is welded to the pressure transmitting part.

An important advantage of the pressure transducer according to the present invention is that it is equipped with a standard pressure sensor. Such pressure sensors are relatively inexpensive. However, standard pressure sensors cannot be used universally because of their relatively low mechanical stability. Instead, manufacturers recommend that the base be supported with a steel plate in order to achieve adequate mechanical stability (see *Siemens Data Book* 1990/91 "Silicon Temperature and Pressure Sensors," page 98). With the pressure transducer according to the present invention, this requirement is easily met by the fact that the standard pressure sensor is in contact with the bottom of the cap-like part, which is weakened only insignificantly by the individual through holes for the connecting wires and the connecting tube, via the intermediate cast resin filling. This assures that the cap-like part will provide adequate mechanical support, and the cast resin assures a uniform pressure load on the standard pressure sensor. The standard pressure sensor with the pressure transducer according to this invention thus has a floating mount to a certain extent which is made possible by the fact that the cap-like part is welded to the pressure transmitting part.

It is known ("Regelungstechnische Praxis rtp [Automatic Control Engineering in Practice], vol. 24, no. 7 (1982), pages 223–229, especially page 229) that a soft elastic material such as silicone rubber may be provided between a pressure pick-up chip and a housing bottom, but the soft elastic material in this reference serves to glue the chip to the bottom of a TO8 housing to produce a pressure sensor with a TO8 housing.

In addition, there is also a known semiconductor pressure pick-up (German patent DE 4,203,832 A1), where a pressure pick-up chip arranged on a base is attached to a chip contact face with silicone rubber. Here again, the silicone rubber in this reference serves as the chip bonding material in the production of a pressure sensor.

DETAILED DESCRIPTION

Figure 1:
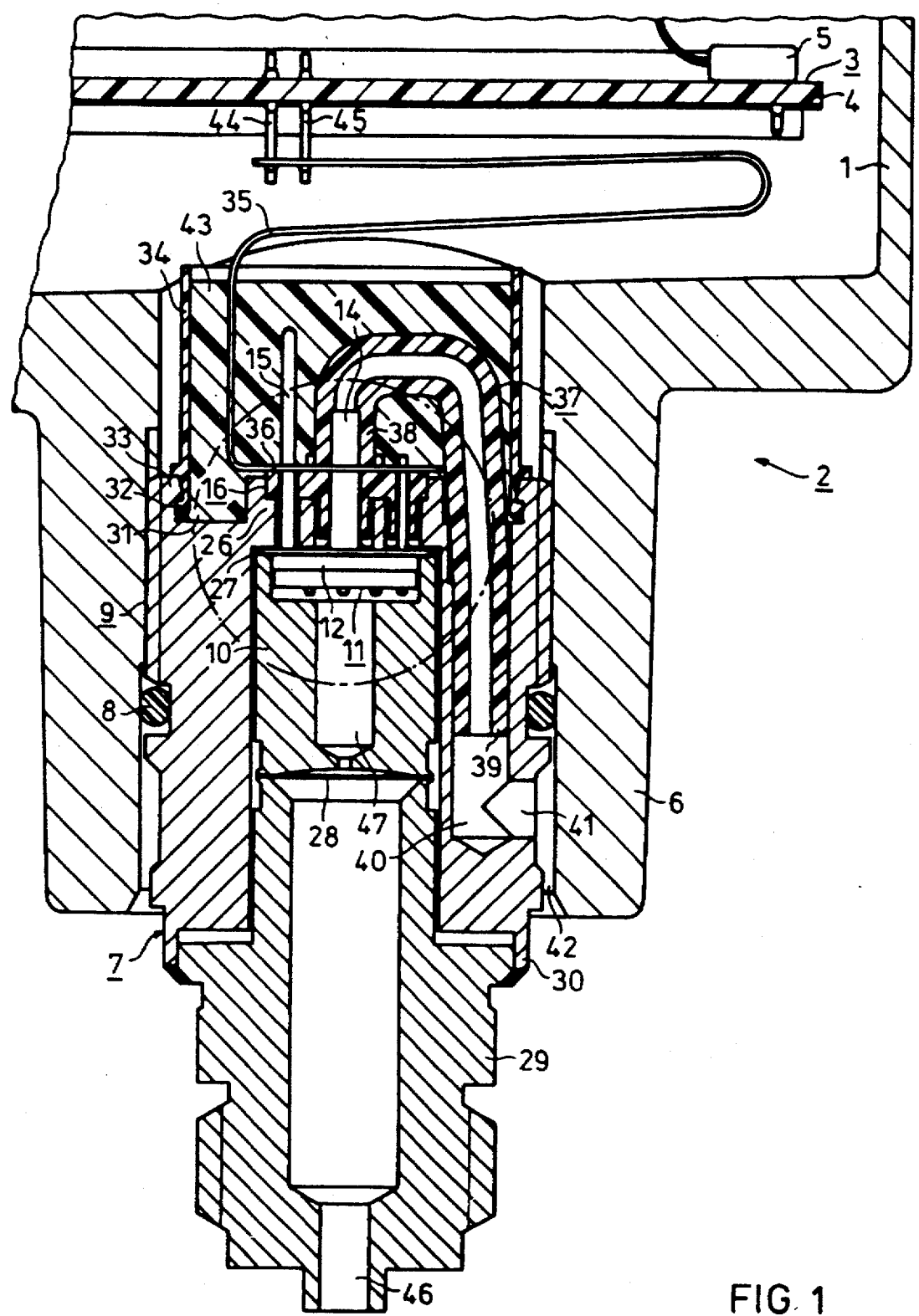
FIG. 1 shows a sectional view of one embodiment of a pressure transducer according to the present invention in conjunction with the parts that are essential according to this invention.

As FIG. 1 shows, an electronic circuit 3 is accommodated in a housing 1 of pressure transducer 2, which is shown only partially; said electronic circuit consists of a circuit board 4 with electronic components 5 that are indicated only partially for reasons of simplicity in the figure.

Housing 1 has a holding connection 6 in the side that is shown at the bottom in FIG. 1, so an insert 7 can be screwed into this connection after inserting a ring gasket 8 in between. In the upper area in FIG. 1, insert 7 has a cap-like part 9 that contains a pressure supplying body 10 to which a standard pressure sensor 11 is attached.

Figure 2:
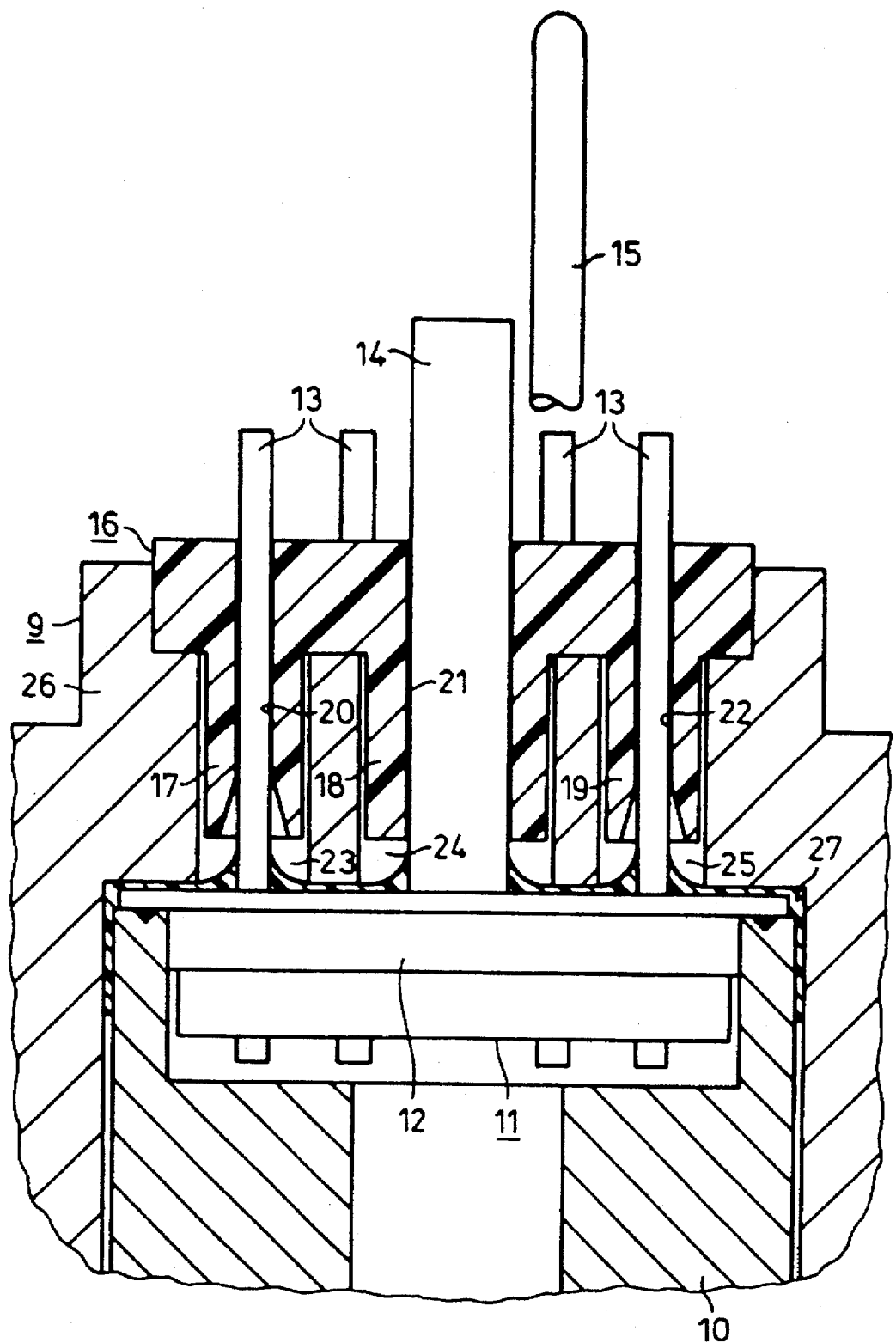
FIG. 2 shows a sectional view of a detail from FIG. 1, rotated by 120° about the longitudinal axis.

Standard pressure sensor 11 may be, for example, a silicon pressure sensor, such as that already described on page 98 of the above-mentioned *Siemens Data Book* 1990/91 "Silicon Temperature and Pressure Sensors." Standard pressure sensor component 11 is provided with a base 12 such as those conventionally used in the production of semiconductor components and is connected to pressure supplying body 10 by welding at the outer edges of this base 12 (see also FIG. 2).

Standard pressure sensor 11 is equipped with a so-called TO8 base, for example, and has connecting wires 13 in a spatial arrangement such as that conventionally used with such bases. A connecting tube 14 on the low pressure side and an oil filling tube 15 lead out of base 12 of standard pressure sensor 11. In In order to have all the connecting elements of standard pressure sensor 11 be insulated, there is an insulating bushing 16 that is provided with projections 17, 18 and 19. Projections 17 through 19 have through holes 20 through 22 in which the connecting elements are inserted. Projections 17 through 19 of insulating bushing 16 project into individual openings 23 through 25 in bottom 26 of cap-like part 9. Weakening of bottom 26 of cap-like part 9 is prevented by providing individual openings 23 through 25. The bottom serves to support standard pressure sensor 11, because it must be mounted in such a way that it is supported in the direction of the low-pressure side. In order to achieve a uniform pressure distribution, the space between base 12 of standard pressure sensor 11 and the adjacent side of bottom 26 is filled with a casting resin 27.

As further shown in FIG. 1, pressure supplying body 10 is welded to a pressure transmitting part 29 over a separating membrane 28, so that in manufacturing the pressure transducer, the standard pressure sensor together with pressure supplying body 10, separating membrane 28 and pressure transmitting part 29 form in an intermediate stage cohesive insert 7 which is welded to the lower end of cap-like part 9 in FIG. 1 when inserted into cap-like part 9 with intermediate casting resin 27. Casting resin 27 is cured in this state under the influence of heat.

Standard pressure sensor 11 is thus held so it floats, so to speak, on bottom 26 of cap-like part 9.

As FIG. 1 also shows, cap-like part 9 is provided with a ring-shaped bore 31 having a side recess 32 on the upper end in FIG. 1. This recess 32 together with upper edge 33 of cap-like part 9 serves to secure a tube 34 made of a flexible material, which is snapped onto cap-like part 9. Before this is done, end 36 of a flexible strip conductor 35 is placed on the top side of insulating bushing 16 in FIG. 1, and the individual conductors provided on flexible strip conductor 35 are connected electrically to connecting wires 13.

FIG. 1 also shows that one end 38 of an insulating tube 37 is pushed onto connecting tube 14 on the low-pressure side of standard pressure sensor 11. The other end 39 of insulating tube 37 is inserted into a borehole 40 in cap-like part 9 that leads to the outside through a side opening 41 and an outlet channel 42. After filling standard pressure sensor 11 with oil through oil filling tube 15 and sealing it, a casting compound 43 is introduced from above into tube 34 made of a flexible material and is cured.

Flexible strip conductor 35 is led up to electric connecting elements 44 and 45 on circuit board 4 in housing 1, as also shown in FIG. 1.

In the pressure transducer, the pressure to be measured is supplied through an opening 46 in pressure transmitting part 29 to standard pressure sensor 11, which then alters its electric properties in a known way, and this change is transmitted to the circuit array in housing 1 via flexible strip conductor 35 for analysis.

We claim:

1. A pressure transducer comprising:

a standard disk-shaped pressure sensor component having a conventional base, such as those used in conventionally manufactured semiconductor components, that is welded to a first end of a pressure supplying body in the edge area on one side, the pressure sensor component further having conventional electrical connecting wires and a conventional connecting tube, the electrical connecting wires and the connecting tube being arranged on a low-pressure side of the pressure sensor component;

a cap-like part which surrounds the pressure sensor component on the outside and whose bottom is above the low-pressure side of the pressure sensor component and which has individual openings for each of the electric connecting wires and the connecting tube, wherein the openings for the electric connecting wires are insulated; and a pressure transmitting part that is connected by a separating membrane to a second end of the pressure supplying body;

wherein the base of the standard pressure sensor component is in contact with the bottom of said cap-like part through an intermediate filling of cast resin, and said cap-like part is welded to the pressure transmitting part.

2. The pressure transducer according to claim 1, further comprising: an insulating bushing engaging said individual openings in the bottom with projections that have through holes for holding the connecting wires and the connecting tube.

* * * * *